(12) United States Patent
Letca et al.

(10) Patent No.: US 8,938,721 B2
(45) Date of Patent: Jan. 20, 2015

(54) MEASURING ACTUAL END USER PERFORMANCE AND AVAILABILITY OF WEB APPLICATIONS

(75) Inventors: Ilarie Letca, Redmond, WA (US); Alexandre Coelho, Redmond, WA (US); Venkata Seshu Kumar Kurapati, Bellevue, WA (US); Rajeev Sudhakar, Seattle, WA (US); Daniel Savage, Redmond, WA (US); Ashvinkumar Sanghvi, Sammamish, WA (US); Jin Soon Lim, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 12/840,783

(22) Filed: Jul. 21, 2010

(65) Prior Publication Data
US 2012/0023487 A1 Jan. 26, 2012

(51) Int. Cl.
*G06F 9/44* (2006.01)
*G06F 9/45* (2006.01)
*G06F 11/34* (2006.01)

(52) U.S. Cl.
CPC ...... *G06F 11/3466* (2013.01); *G06F 2201/865* (2013.01); *G06F 2201/875* (2013.01)
USPC ............ 717/130; 717/124; 717/127; 717/158

(58) Field of Classification Search
CPC .. G06F 8/443; G06F 11/3688; G06F 11/3466
See application file for complete search history.

(56) References Cited

U.S. PATENT DOCUMENTS

| | | | |
|---|---|---|---|
| 6,738,933 B2 | 5/2004 | Fraenkel et al. | |
| 7,197,559 B2 | 3/2007 | Goldstein et al. | |
| 7,634,562 B2 | 12/2009 | Litofsky et al. | |
| 7,685,270 B1 | 3/2010 | Vermeulen et al. | |
| 8,464,225 B2 * | 6/2013 | Greifeneder | 717/130 |
| 8,495,584 B2 * | 7/2013 | Beaty et al. | 717/127 |
| 8,533,687 B1 * | 9/2013 | Greifeneder et al. | 717/130 |
| 8,799,884 B2 * | 8/2014 | Dreyer et al. | 717/158 |
| 8,806,437 B2 * | 8/2014 | Arcese et al. | 717/124 |
| 2007/0083649 A1 | 4/2007 | Zuzga et al. | |
| 2008/0228862 A1 | 9/2008 | Mackey | |
| 2008/0229300 A1 | 9/2008 | O'Brien | |
| 2008/0288212 A1 | 11/2008 | Greifeneder | |
| 2008/0294716 A1 * | 11/2008 | Couvreur | 709/203 |

(Continued)

OTHER PUBLICATIONS

Cesarini et al., From HTTP to HTML: Erlang/OTP experiences in web based service applications, Sep. 2006, 6 pages.*

(Continued)

*Primary Examiner* — Thuy Dao
(74) *Attorney, Agent, or Firm* — Jim Sfekas; Kate Drakos; Micky Minhas

(57) ABSTRACT

Techniques for monitoring web application performance are provided. A request for a web application is received at an application server. A response pipeline at the application server generates client application code corresponding to the requested web application. The client application code is intercepted in the response pipeline. Instrumentation code is inserted into the intercepted client application code to generate an instrumented client application code. The instrumentation code is configured to be executed when the instrumented client application code is rendered at the client to capture performance information at the client, and is configured to transmit the captured performance information from the client.

20 Claims, 10 Drawing Sheets

(56) References Cited

U.S. PATENT DOCUMENTS

2009/0254821 A1 10/2009 Cates
2009/0292791 A1* 11/2009 Livshits et al. ............... 709/217
2012/0102470 A1* 4/2012 Yang et al. .................... 717/130

OTHER PUBLICATIONS

Magalhaes et al., Root-cause analysis of performance anomalies in web-based applications, Mar. 2011, 8 pages.*
"International Search Report and Written Opinion", Mailed Date: Feb. 24, 2012, Application No. PCT/US2011/044905, Filed Date: Jul. 21, 2011, pp. 8.
Kiciman, et al., "AjaxScope: A Platform for Remotely Monitoring the Client-Side Behavior of Web 2.0 Applications", Retrieved at <<www.cs.uwaterloo.ca/~brecht/courses/.../web/ajaxscope-sosp-2007.pd>>, Proceedings of 21st ACM Symposium on Operating Systems Principles (SOSP '07), Oct. 14-17, 2007, pp. 14.
Kiciman, et al., "AjaxScope: A Platform for Remotely Monitoring the Client-Side Behavior of Web 2.0 Applications", Retrieved at << http://research.microsoft.com/pubs/75102/ajaxscope-sosp.pdf >>, ACM Symposium on Operating Systems Principles, Proceedings of twenty-first ACM SIGOPS symposium on Operating systems principles, Oct. 14-17, 2007, pp. 14.
Kiciman, et al., "Live Monitoring: Using Adaptive Instrumentation and Analysis to Debug and MaintainWeb Applications", Retrieved at << http://research.microsoft.com/pubs/75101/webappmonitoring.pdf>>, Proceedings of the 11th USENIX workshop on Hot topics in operating systems, May 7-9, 2007, pp. 6.
Grabner, Andreas., "Why Web 2.0 Requires End-To-End Performance Analysis and How to Do It", Retrieved at << http://blog.dynatrace.com/2010/02/10/why-web-2-0-requires-end-to-end-performance-analysis-and-how-to-do-it/ >>, Feb. 10, 2010, pp. 12.
"Securely Implement Request Processing, Filtering, and Content Redirection with HTTP Pipelines in ASP.NET", Retrieved at << http://msdn.microsoft.com/en-us/magazine/cc188942.aspx >>, Retrieved Date: Apr. 19, 2010, pp. 14.
"Web Load and Performance Testing: Gomez Reality Load XF—On-Demand Realistic Load and Performance Testing from Browser to Data Center", Retrieved at << http://www.gomez.com/products-solutions/products/load-testing/ >>, Retrieved Date: Apr. 19, 2010, pp. 6.
"Knoa Delivers the Industry's First Extensible Platform for Universal End-User Experience and Performance Monitoring", Retrieved at << http://www.knoa.com/main/knoa-products-technology.jsp >>, Retrieved Date: Apr. 19, 2010, pp. 2.
Second Office Action Received in China Patent Application No. 201110206369., Mail Date: Oct. 10, 2013, File Date: Jul. 14, 2011, 11 Pages.
Final Rejection Received in China Patent Application No. 201110206369.4, Mail Date: Feb. 21, 2014, File Date: Jul. 14, 2011, 11 Pages.

* cited by examiner

1300

MEASURING ACTUAL END USER PERFORMANCE AND AVAILABILITY OF WEB APPLICATIONS

BACKGROUND

A web application is an application that is accessed over a network, such as the Internet, to be executed at a client computer system. A web application may have various forms, such being a Java applet, being coded in a browser-supported language (such as JavaScript, and combined with a browser-rendered markup language such HTML (hypertext markup language)), or having other form. A web browser may be used to retrieve a web application from an application server, and to execute the web application at the client computer system by rendering the retrieved web application code.

Web applications are becoming more common due to the widespread availability of web browsers. Furthermore, web applications are advantageous as they may be maintained and updated at an application server rather than individually at numerous client computers. Numerous types of web applications exist, including media players, webmail, online retail sales, online auctions, wikis, and many other types. The term "Web 2.0" is commonly associated with web applications that facilitate interactive information sharing, interoperability, user-centered design, and collaboration on the World Wide Web. A Web 2.0 website allows its users to interact with each other as contributors to the website's content, in contrast to websites where users are limited to the passive viewing of information that is provided to them.

As more organizations begin to develop web applications that utilize Web 2.0 technologies to create richer and more complex interactions, the ability to effectively monitor web application performance and availability is becoming more important. Conventional approaches to determining web application performance typically involves performing test transfers of web application content ("synthetic transactions") at regular intervals, or capturing metrics based on server side operations. However, neither synthetic transactions nor capturing server side metrics indicates a quality of the end user's experience at the client computer system. Simply measuring whether a page was delivered to a client correctly and within acceptable response times does not accurately indicate whether the web application was available and performed well from the standpoint of the end user at the client. Technologies such as AJAX (asynchronous JavaScript and XML (extensible markup language)), Adobe® Flash®, developed by Adobe Systems of San Jose, Calif., and Microsoft® Silverlight™, developed by Microsoft Corporation of Redmond, Wash., may use client side processing to control complex interactions of web applications. However, such client side processing cannot be directly monitored at the server, and thus the performance of such client side processing is not determinable using conventional approaches.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products for monitoring web application performance are provided herein. Web applications are enabled to be monitored at client computer systems, and captured performance information regarding the web application at clients is enabled to be provided to a server. The provided performance information enables client side web application performance to be analyzed from the standpoint of the end user.

In one implementation, a request for a web application is received at an application server. Client application code corresponding to the requested web application is generated. The generated client application code is intercepted. Instrumentation code is inserted into the intercepted client application code to generate an instrumented client application code. The instrumentation code is configured to be executed when the instrumented client application code is rendered at the client to capture performance information at the client, and is configured to transmit the captured performance information from the client.

In another implementation, an application server includes a response pipeline, an application scanning module, and an instrumentation insertion module. The response pipeline is configured to generate a data stream that includes client application code to be provided to a client in response to a request from the client for a web application. The application scanning module is configured to intercept the client application code in the response pipeline. The instrumentation insertion module is configured to insert instrumentation code into the intercepted client application code to generate an instrumented client application code. The instrumentation code is configured to be executed when the instrumented client application code is rendered at the client to capture performance information at the client, and is configured to transmit the captured performance information from the client.

The response pipeline may be configured in various ways to generate the instrumented client application code, including using a response filter, an HTTP (hypertext transfer protocol) module, a profiler, or other technique.

In a further implementation, a client may transmit a request to a server for a web application. The client may receive an instrumented client application code from the server in response to the request. The instrumented client application code is configured to implement the web application, and includes instrumentation code inserted into the instrumented client application code at the server. The instrumentation code is configured to be executed to capture performance information at the client when the instrumented client application code is rendered at the client, and is configured to transmit the captured performance information from the client.

In a still further implementation, a management server may include a performance data receiving module. The performance data receiving module is configured to receive captured performance information from the instrumented client application code at the client.

Computer program products are also described herein for monitoring web application performance at client computer systems, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
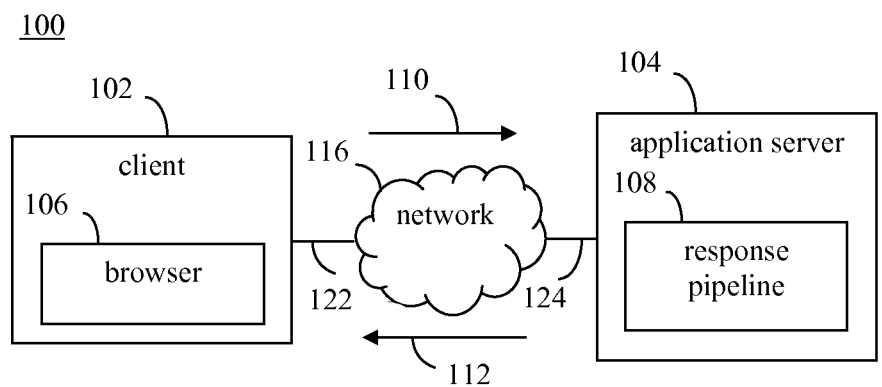
FIG. 1 shows a block diagram of a data communication system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Example Embodiments

Embodiments provide techniques for monitoring web application performance from the client or end user perspective. Such embodiments enable improved web application monitoring as compared to conventional techniques that are server-side based. Furthermore, embodiments may enable web application monitoring under different network conditions and with different client computer configurations.

Differences in network speed and quality across the Internet can slow or break web application functionality for the end user. Furthermore, server, cache, and/or client components may combine to provide a web application service, and each can affect the quality of web application performance. More performance variables become apparent when the wide variety of devices and browsers that are used at clients to render web application content. Device types, browser types, network configurations, and other server side, network, and client side attributes are constantly changing. Conventional server-side metrics may be used to determine an amount of time used to send content to the client, but each different client device or browser may change how the client perceives performance and availability. Thus, to obtain a true picture of the performance and availability of a web application, embodiments enable web application performance to be monitored from the actual end user perspective.

Embodiments may enable client side web application monitoring in various ways. For instance, in an embodiment, instrumentation code (e.g., one or more scripts) may be added to a web application page by the application server. For instance, the stream of web application data that is normally delivered to the client in response to a web application request may be modified based on a predetermined policy to add instrumentation code to the stream. When the instrumentation code is executed on the client, the instrumentation code collects metrics and data. For instance, the instrumentation code may be configured to collect and calculate web application page performance/availability metrics when a web application page is rendered at the client, such as in the client browser. After page performance/availability metrics are collected, the instrumentation code may call a service side end-point and submit the collected information to the service side end-point.

As such, embodiments enable instrumentation code to be added at the web page level during application development time or during runtime, such as by automatically injecting instrumentation code into a page of the web application as web application-related traffic passes through a response pipeline (e.g., an HTTP pipeline) at the application server.

Embodiments provide various advantages. For instance, embodiments may enable operations managers to have the ability to monitor applications that rely heavily on web technologies, including Web 2.0 technologies such as AJAX (asynchronous JavaScript and XML (extensible markup language)), Adobe® Flash®, and Microsoft® Silverlight™. The instrumentation code may be configured to capture performance information, such as the page availability and response time of such web technologies, from the client perspective, and to make this data available to a monitoring system in various ways, such as through a web service end point.

Example embodiments are described in further detail in the following subsections.

A. Example Systems and Methods for Providing Instrumented Web Applications

In embodiments, a web application is provided with instrumentation code when the web application is requested by a client computer system, and the instrumented web application is delivered to the client computer system. Instrumented web applications may be provided to client computer systems in response to client requests in various ways. For example, FIG. 1 shows a block diagram of a data communication system 100, according to an, example embodiment. As shown in FIG. 1, system 100 includes a client 102, an application server 104, and a network 116. System 100 is described as follows to illustrate delivery of web applications to clients, including instrumented web applications.

Client 102 may be any type of computing device, including a desktop computer (e.g., a personal computer), a mobile computer or computing device (e.g., a Palm® device, a RIM Blackberry® device, a personal digital assistant (PDA), a laptop computer, a notebook computer, etc.), a smart phone, or other type of computing device. Application server 104 may include one or more servers, which may be any type of computing device described herein or otherwise known that enables web applications to be served. Client 102 and application server 104 are communicatively coupled by network 116. Network 116 may include one or more communication links and/or communication networks, such as a PAN (personal area network), a LAN (local area network), a WAN (wide area network), or a combination of networks, such as the Internet. First and second communication links 122 and 124, which respectively couple client 102 and application server 104 to network 116, may include any number of communication links, including wired and/or wireless links, such as IEEE 802.11 wireless LAN (WLAN) wireless links, Worldwide Interoperability for Microwave Access (WiMAX) links, cellular network links, wireless personal area network (PAN) links (e.g., Bluetooth™ links), Ethernet links, USB links, etc.

System 100 is configured to enable client computer systems such as client 102 to retrieve web applications from application server 104. For example, as shown in FIG. 1, client 102 includes a browser 106. A user at client 102 may interact with browser 106 to cause browser 106 to request a web application to be loaded and executed in browser 106. Browser 106 may be any type of web browser, such as Internet Explorer®, developed by Microsoft Corp. of Redmond, Wash., Mozilla Firefox®, developed by Mozilla Corp. of Mountain View, Calif., or Google® Chrome developed by Google Inc. of Mountain View, Calif.

For instance, browser 106 may generate a web application request 110. Web application request 110 is a request for a web application to be executed in browser 106. Web application request 110 is transmitted from client 102 in a first communication signal through first communication link 122, network 116, and second communication link 124, to application server 104. The first communication signal may be transmitted in any form. Application server 104 receives web application request 110 in the first communication signal. In response to web application request 110, application server 104 provides a web application. Furthermore, the web application may be "instrumented" by application server 104 such that the web application is configured to monitor one or more performance aspects at client 102. The web application may be instrumented by application server 104 by inserting instrumentation code into the web application that is configured to monitor the one or more performance aspects.

For instance, as shown in FIG. 1, application server 104 may include a response pipeline 108. Response pipeline 108 may generate an instrumented client application code 112 in response to web application request 110. Instrumented client application code 112 is transmitted in a second communication signal from application server 104. The second communication signal is transmitted through second communication link 124, network 116, and first communication link 122, and is received by client 102. The second communication signal may be transmitted in any form. Browser 106 at client 102 receives instrumented client application code 112, and may load instrumented client application code 112 for execution.

Instrumented client application code 112 is a web application that may be executed (e.g., rendered) by browser 106 at client 102. For example, instrumented client application code 112 may have the form of a page (e.g., coded using HTML code) that invokes one or more application files. Instrumented client application code 112 may include references to application files programmed according to one or more browser-supported computer languages, such as HTML, AJAX (asynchronous JavaScript and XML (extensible markup language)) code, Adobe® Flash® files (e.g., ActionScript code), Microsoft® Silverlight™ files (e.g., XAML (extensible application markup language) code), media files, etc. Furthermore, instrumented client application code 112 includes instrumentation code that is configured to monitor performance of one or more aspects of the web application. Such instrumentation code may be programmed according to one or more browser-supported computer languages, such as HTML, Javascript, AJAX, XAML, any Microsoft®.NET Framework supported programming language, etc.

Figure 2:
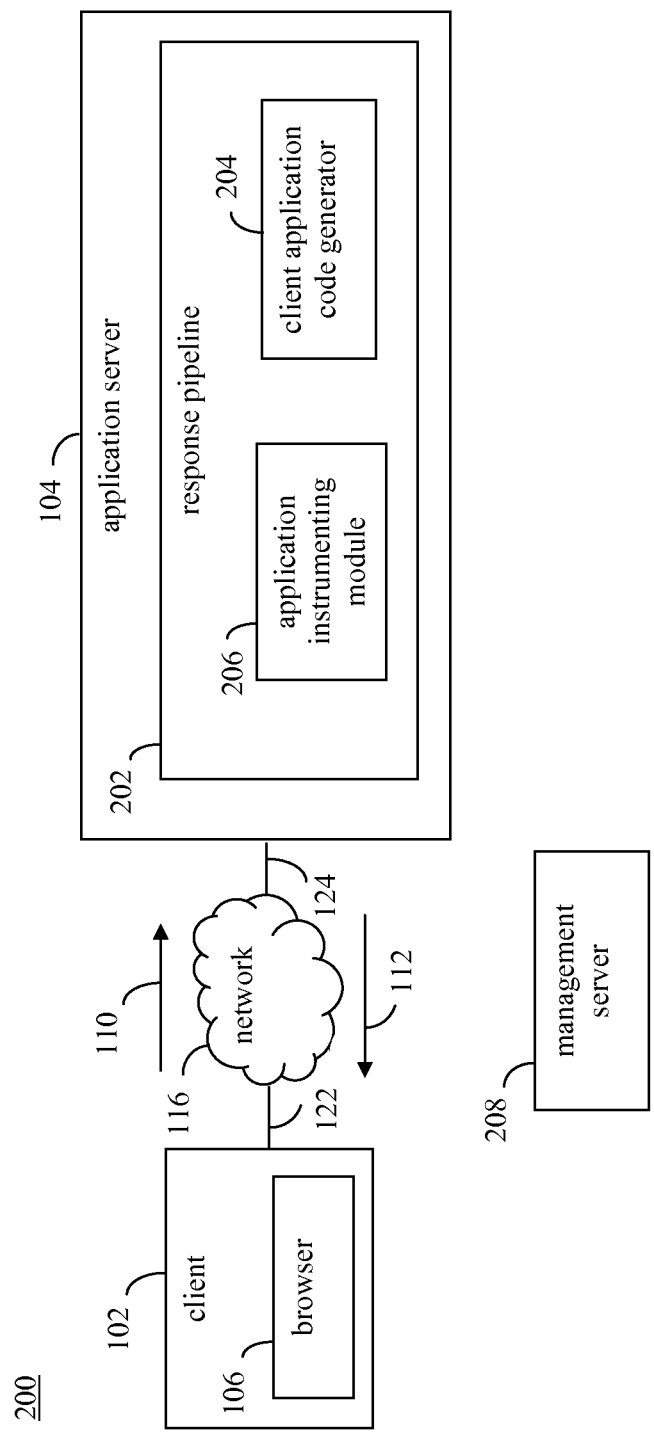
FIG. 2 shows a block diagram of an example of the data communication system of FIG. 1, according to an embodiment.

System 100 may be further configured in various ways to provide an instrumented web application. For example, FIG. 2 shows a block diagram of a data communication system 200, according to an example embodiment. Data communication system 200 is an example of system 100 of FIG. 1. As shown in FIG. 2, data communication system 200 includes client 102, application server 104, network 116, and a management server 208, and application server 104 includes response pipeline 202. Response pipeline 202 is an example of response pipeline 108 of FIG. 1. In the example embodiment of FIG. 2, response pipeline 202 includes a client application code generator 204 and an application instrumenting module 206. As described above, application server 104 is configured to service web application requests 110 received from clients through network 116, such as client 102. Client application code generator 204 of response pipeline 202 is configured to generate client application code in response to request 110, and application instrumenting module 206 is configured to intercept and instrument the generated client application code. Application server 104 is configured to transmit the instrumented client application code to client 102, to be rendered in browser 106. Management server 208 may be present to configure application instrumenting module 206, and/or to receive performance data generated by the instrumented client application code running in browser 106.

In alternative embodiments, system 100 may be configured in other ways to provide an instrumented web application. For example, in another embodiment, system 200 of FIG. 2 may include a proxy server positioned between client 102 and application server 104. The proxy server may include application instrumenting module 206, and thus instrumenting of web applications may be performed at the proxy server. The proxy server may receive the client application code generated by client application code generator 204 and transmitted from application server 104. Application instrumenting module 206 in the proxy server may intercept and instrument the generated client application code. The proxy server may transmit the instrumented client application code to client 102, to be rendered in browser 106. In another embodiment, client 102 may include application instrumenting module 206, and thus instrumenting of web applications may be performed in client 102. Client 102 may receive the client application code generated by client application code generator 204 and transmitted from application server 104. Application instrumenting module 206 in client 102 may intercept and instrument the generated client application code. The instrumented client application code may be rendered in browser 106. In such embodiments, a user, such as an IT (information technology) operator, can introduce application instrumentation even the user is not associated with application server 104. Although embodiments are described herein with respect to the configurations of FIGS. 1 and 2 for purpose of illustration, embodiments may be configured in these and further alternative ways, as would be understood by persons skilled in the relevant art(s) from the teachings herein.

Figure 3:
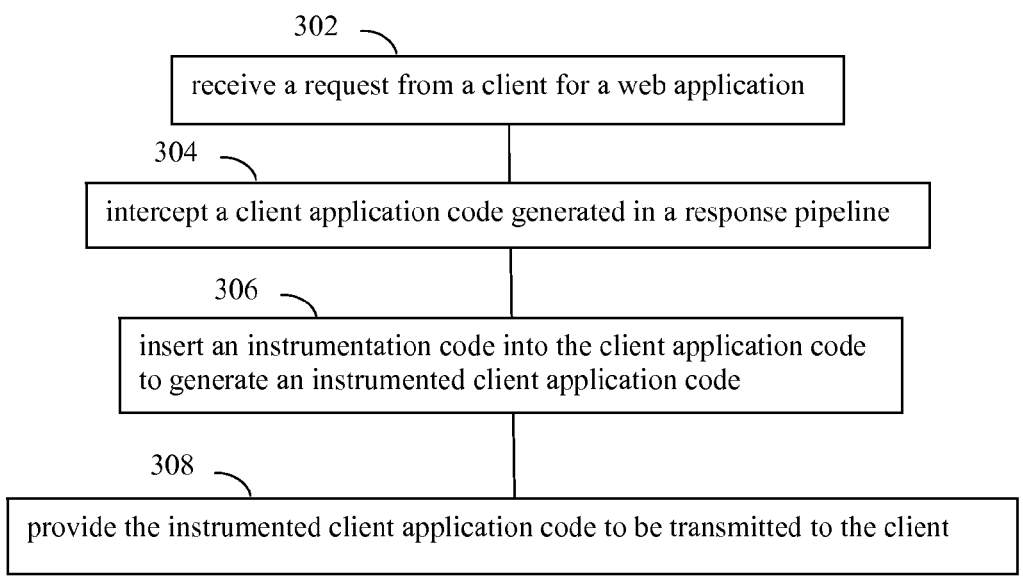
FIG. 3 shows a flowchart for providing an instrumented web application, according to an example embodiment.

System 200 is further described as follows with respect to FIG. 3. FIG. 3 shows a flowchart 300 for providing an instrumented web application, according to an example embodiment. In an embodiment, system 200 may operate according to flowchart 300. Further structural and operational embodiments will be apparent to persons skilled in the relevant art(s) based on the discussion regarding flowchart 300. Flowchart 300 and system 200 are described as follows.

Flowchart 300 begins with step 302. In step 302, a request from a client for a web application is received. For example, as shown in FIG. 2, and described above, application server 104 receives web application request 110 from client 102. Web application request 110 includes a request for a web application. For example, a user at client 102 may interact with browser 106 to navigate to a web page corresponding to the requested web application. The user at client 102 may select a link, an image, or other object on a web page, may select a bookmark, or may otherwise interact with browser 106 to generate web application request 110 to request the web application.

In step 304, a client application code generated in a response pipeline is intercepted. Response pipeline 202 of FIG. 2 may include multiple stages that perform corresponding processes with regard to satisfying web application request 110. In an embodiment, client application code generator 204 in response pipeline 202 may be configured to generate client application code corresponding to the web application requested in request 110. For example, client application code generator 204 may generate browser-compatible code, such as HTML code, corresponding to a generated web page, and may generate the web page to invoke one or more files corresponding to desired web application functionality. For instance, the web page may invoke AJAX code, XAML code, an Adobe® Flash® file, a Microsoft® Silverlight™ file, etc., corresponding to web application functionality, such as a media player, a webmail tool, an online retail sales site, an online auction, a wiki, etc. Client application code generator 204 may be configured to generate client application code in response to web application requests from scratch, from a library of client application code templates (e.g., coded in the C# programming language or other programming language) corresponding to different web applications that may be requested, and/or in any other manner, as would be known to persons skilled in the relevant art(s). The client application code generated by client application code generator 204 is passed through response pipeline 202 in a data stream.

An example of generated client application code (in HTML format) is shown as follows. This example client application code is configured as a web page that invokes a media player (Microsoft® Silverlight™) web application for a user at client 102. The web page may be rendered in browser 106. This example of client application code is provided for purposes of illustration, and is not intended to be limiting, and may be configured in numerous alternative ways:

```
<body>
<form name="form1" method="post" action="Default.aspx" id="form1">
//<![CDATA[
Sys.Application.initialize( );
Sys.Application.add_init(function( ) {
  $create(Sys.UI.Silverlight.MediaPlayer,
{"autoPlay":true,"mediaSource":http://www.webinfocentral.com/VIDEO/
JJ2008/WMV/JJ2008_100.wmv ...
});
//]] >
</form>
</body>
```

The above example of client application code is configured to invoke the media player to play the file "http://www.webinfocentral.com/VIDEO/JJ2008/WMV/JJ2008$_{13}$ 100.wmv", which is an example Microsoft® Windows Media® Video format file. As indicated by " . . . " in the example of client application code, further parameters related to invoking the media player may optionally be present. Although this example of client application code invokes a single application, generated client application code may invoke multiple applications.

Figure 4:
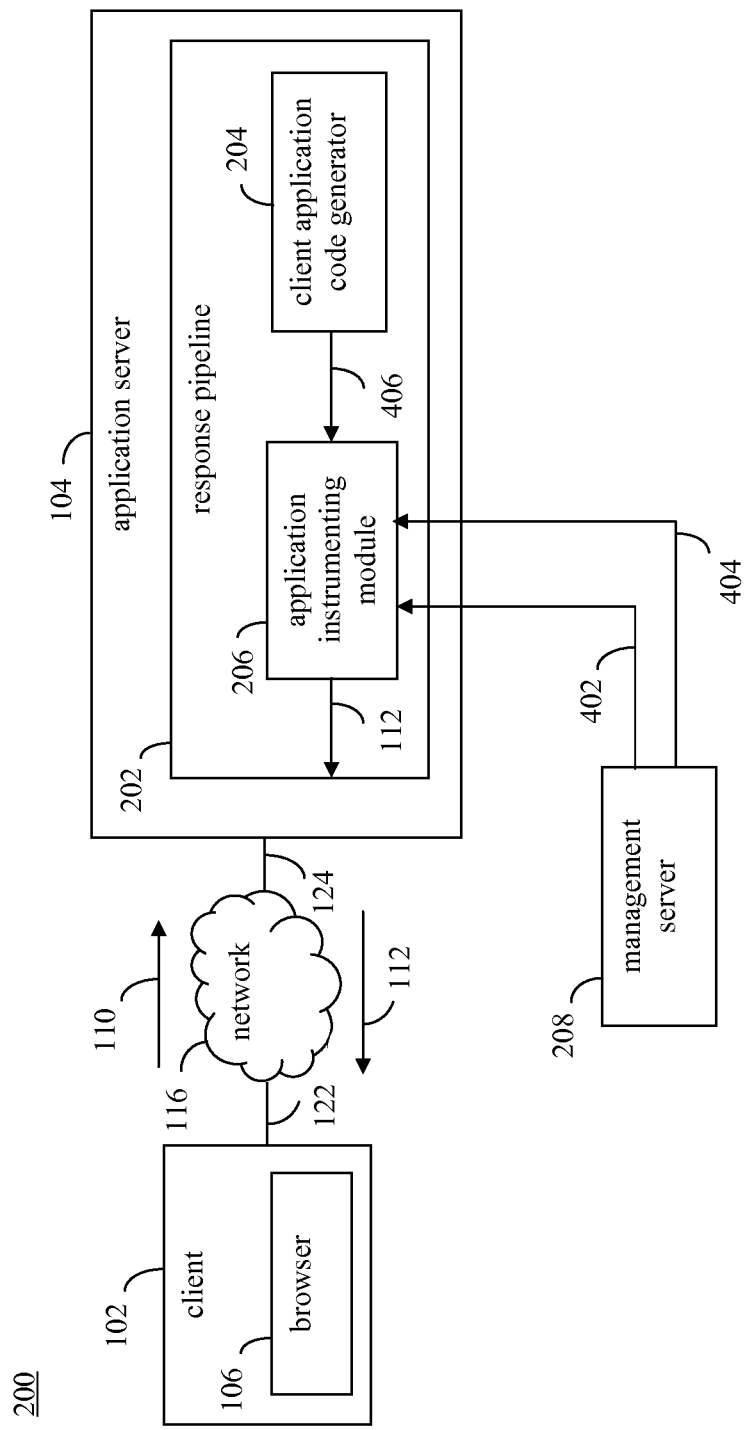
FIG. 4 shows the data communication system of FIG. 2, where an instrumented web application is generated in response to a web application request, according to an example embodiment.

FIG. 4 shows system 200 of FIG. 2, where client application code generator 204 generates client application code 406 corresponding to the web application requested in request 110. In an embodiment, application instrumenting module 206 may be configured to intercept client application code 406 based on a scanning policy. In an embodiment, management server 208 may configure the scanning policy for application instrumenting module 404 according to a scanning policy configuration indication 402.

Figure 5:
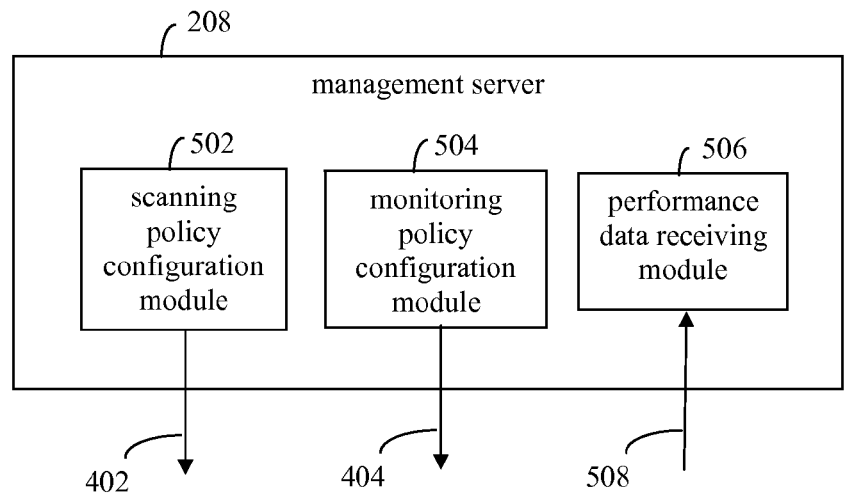
FIG. 5 shows a block diagram of a management server, according to an example embodiment.
Figure 6:
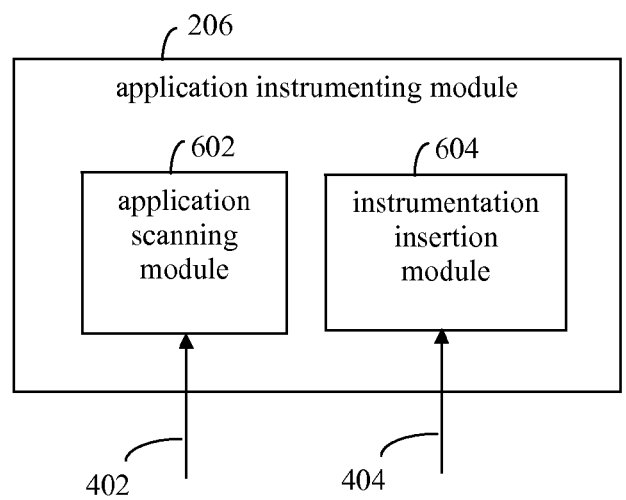
FIG. 6 shows a block diagram of an application instrumenting module, according to an example embodiment.

For instance, FIG. 5 shows a block diagram of management server 208, according to an example embodiment. As shown in FIG. 5, management server 208 includes a scanning policy configuration module 502, a monitoring policy configuration module 504, and a performance data receiving module 506. In an embodiment, scanning policy configuration module 502 may generate scanning policy configuration indication 402 used to configure the scanning policy used by application instrumenting module 404. For instance, FIG. 6 shows a block diagram of application instrumenting module 404, according to an example embodiment. As shown in FIG. 6, application instrumenting module 404 includes an application scanning module 602 and an instrumentation insertion module 604. Application scanning module 602 receives scanning policy configuration indication 402, and is configured to scan web applications (e.g., client application code 406) passing through response pipeline 202 according to scanning policy configuration indication 402 to determine whether to instrument the client application code.

For example, a user (e.g., an operations manager or system administrator) at management server 208 may interact with a user interface (e.g., a graphical user interface (GUI), keyboard, pointing device, etc.) to input a scanning policy for web applications served by application server 104. For instance, the user may be enabled to designate particular web applications (e.g., functions or files) in any manner, including by file extension or type (e.g., Adobe® Flash® files, Microsoft® Silverlight™ files, other media file types, .wmv (e.g., video file) extension, .mp3 extension (e.g., audio file), etc.), to be instrumented. The designated web applications may be indicated in scanning policy configuration indication 402, which is transmitted to application scanning module 602. When application instrumenting module 206 receives client application code 406, application scanning module 602 may scan client application code 406 according to the scanning policy indicated by scanning policy configuration indication 402 to determine whether client application code 406 is to be instrumented.

For instance, scanning policy configuration indication 402 may configure application scanning module 602 to intercept web applications that invoke Microsoft® Silverlight™ for instrumenting. In examples of such an embodiment, application scanning module 602 may be configured to scan received client application code for the word "Silverlight", and/or may be configured in other ways to detect Microsoft® Silverlight™ web application functionality. Referring to the example client application code shown above (which invokes Microsoft® Silverlight™ as a media player), if this example client application code is received by application instrumenting module 206, application scanning module 602 may detect the word "Silverlight" in the client application code, and therefore intercept the client application code for instrumenting. If application scanning module 602 determines during a scan that a received client application code does not include content that triggers instrumenting according to the configured scanning policy, the received client application code is allowed to continue processing in response pipeline 202 to be provided to client 102 without being instrumented.

In step 306, instrumentation code is inserted into the client application code to generate an instrumented client application code. In an embodiment, if application scanning module 602 intercepts client application code (in step 304) in the response data stream flowing through response pipeline 202 and determines that the intercepted client application code is to be instrumented, instrumentation insertion module 604 is configured to insert instrumentation code into the intercepted client application code, to generate an instrumented response data stream. In an embodiment, instrumentation insertion module 604 may be configured to analyze the intercepted client application code to determine one or more functions of the client application code to monitor. Instrumentation insertion module 604 may be configure the inserted instrumentation code to monitor the one or more functions of the client application code desired to be monitored. The inserted instrumentation code is configured to monitor performance aspects related to the intercepted client application code. As shown in FIG. 4, application instrumented module 206 may generate instrumented client application code 112, which is an instrumented version of received client application code 406.

Referring to the example of generated client application code described above, instrumentation code may be inserted to monitor performance aspects of the example client application code. For instance, an example of instrumentation code is shown below (provided at least partially as pseudocode for ease of illustration) that may be inserted in the example of generated client application code described above:

```
<script type="text/javascript">
Function makeCall (operationName ,counterName)
{
//pseudo code
call _webService (operationName ,counterName) // e.g operationName = StartPerfCounter and counterName= "Page Load"
}
</script>
```

This example instrumentation code is a javascript script configured to provide a time or performance counter value when called by invoking the "makeCall" function with "operationName" and "counterName" parameters. The script may be used for a variety of purposes, such as determining an amount of time it takes to play the referenced media file using the Microsoft® Silverlight™ media player in the above example of client application code. When invoked, this script makes a call ("_webService") to a remote management server (e.g., management server 208), supplying the "operationName", "counterName", and a performance counter value. This performance information may be used at the management server to determine when corresponding functions occurred.

This instrumentation code may be inserted in the generated client application code, and the generated client application code may be further modified by instrumentation insertion module 604 to invoke the inserted instrumentation code at various times when the client application code is invoked by a browser. For instance, an example instrumented form of the example client application code shown above that includes the example instrumentation code shown above is shown below. This example of instrumented client application code is provided for purposes of illustration, is not intended to be limiting, and may be configured in numerous alternative ways:

```
<header>
<script type="text/javascript">
Function makeCall (operationName ,counterName)
{
//pseudo code
call _webService (operationName ,counterName) // e.g operationName = StartPerfCounter and counterName= "Page Load"
}
</script>
</header>
<body>
<script type="text/javascript">makeCall("StartPerfCounter", "Page Load")</script>
<form name="form1" method="post" action="Default.aspx" id="form1">
//<![CDATA[
Sys.Application.initialize( );
Sys.Application.add_init(function( ) {
   $create(Sys.UI.Silverlight.MediaPlayer,
{"autoPlay":true,"mediaSource":http://www.webinfocentral.com/VIDEO/
JJ2008/WMV/JJ2008_100.wmv....{"mediaEnded":OnClientMediaEnded,
"mediaOpened":OnClientMediaOpened}.... });
//]]>
</form>
<script type="text/javascript">makeCall("EndPerfCounter", "Page Load")</script>
</body>
```

As shown above, the previously described javascript script is inserted in a header section of the example client application code. Furthermore, the example client application code is modified at four code locations to cause the header script to be invoked at each of the four locations.

For instance, the example client application code is configured to invoke the header script at the time the page represented by the example client application code begins to load, as indicated by the inserted code <script type="text/javascript">makeCall("StartPerfCounter", "Page Load"). Next, the media player is caused to invoke the header script at the time the media file (the ".wmv" file) is opened, as indicated by the inserted code "mediaOpened":OnClientMediaOpened. Next, the media player is caused to invoke the header script at the time the media file is closed, as indicated by the inserted code "mediaEnded":OnClientMediaEnded. Still further, the media player is caused to invoke the header script at the time the page represented by the example client application code is finished loading, as indicated by the inserted code <script type="text/javascript">makeCall("EndPerfCounter", "Page Load")</script>.

In this manner, in this example, the header script can be used to capture performance information indicating start and ending load times, and a load duration (by subtracting the start load time or counter value from the end load time or counter value), for the page represented by the example client application code. Furthermore, the header script can be used to capture performance information indicating start and ending media play times, and a play duration (by subtracting the start play time or counter value from the end play time or counter value), for the media file (the ".wmv" file).

As such, instrumentation insertion module 604 may be configured to insert instrumentation code into the intercepted client application code in one or more locations to enable one or more scripts/code portions to be invoked when the instrumented web application is rendered in a browser. Any one or more performance aspects related to the instrumented web application may be monitored by any number of inserted instrumentation code portions. For instance, network-related aspects may be monitored, including determining start and end load times, and time durations for loading the instrumented web application. Browser-related aspects may be monitored including media file play start and end times, and time durations for playing referenced media files, etc. Still further, instrumentation code may be configured to collect information regarding the client computer system and/or the browser, including a type of browser at the client, a browser version, client computer type, a client computer location, a client computer language, a client computer operating system type/version, etc.

In an embodiment, application instrumenting module 206 may be configured to instrument client application code 406 based on a monitoring policy. In an embodiment, management server 208 may configure the monitoring policy for application instrumenting module 404 according to a monitoring policy configuration indication 404. For instance, as shown in FIGS. 5 and 6, instrumentation insertion module 604 may be configured to modify intercepted client application code 406 according to monitoring policy configuration indication 404 generated by monitoring policy configuration module 504.

For example, a user (e.g., an operations manager or system administrator) at management server 208 may interact with a user interface (e.g., a graphical user interface (GUI), keyboard, pointing device, etc.) to input a monitoring policy for intercepted web applications. For example, the user may be enabled to designate particular instrumentation code to be applied to particular web applications (e.g., functions or files) in any manner, including by file extension or type (e.g., Adobe® Flash® files, Microsoft® Silverlight™ files, other media file types, .wmv (Windows Media® Video) extension, .mp3 extension, etc.) to be instrumented. The designated monitoring policy may be indicated in monitoring policy configuration indication 404, which is transmitted to instrumentation insertion module 604. When application instrumenting module 206 receives intercepted client application code 406, instrumentation insertion module 602 may modify the intercepted client application code 406 according to the monitoring policy provided by monitoring policy configuration indication 404.

In step 308, the instrumented client application code is provided to be transmitted to the client. For example, as shown in FIG. 4, instrumented client application code 112 generated in response pipeline 202 may be transmitted to client 102 from application server 104. In an embodiment, application server 104 may include a network interface, such as described elsewhere herein, for transmitting information over communication links including client application code 112. Response pipeline 202 may output instrumented client application code 112 to be provided to the network interface to be transmitted to client 102.

B. Example Response Pipeline Embodiments

Figure 7:
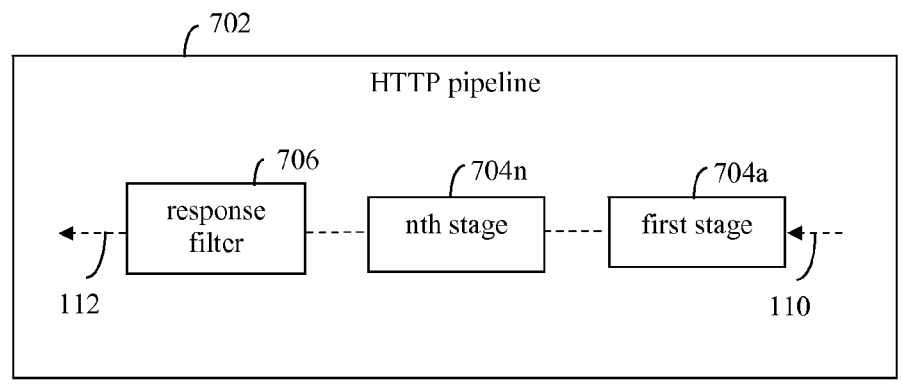
FIGS. 7-9 show block diagrams of examples of a response pipeline, according to embodiments.
Figure 8:
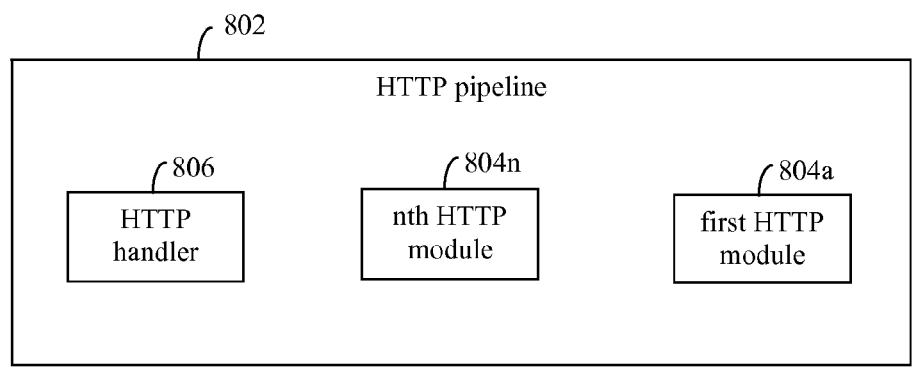
Figure 9:
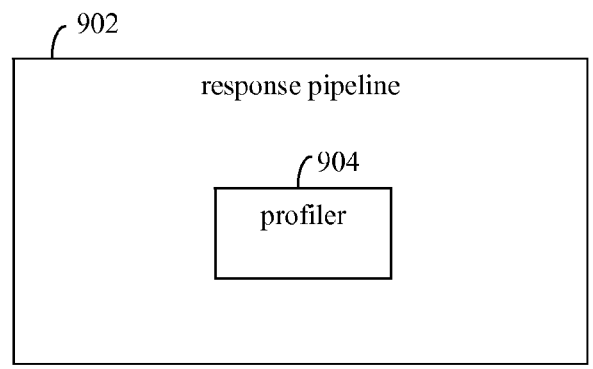

Response pipeline 202 may be configured in various ways to generate instrumented web applications in response to web application requests. For instance, in an embodiment, response pipeline 202 may be a WCF (Windows Communication Foundation) pipeline or an HTTP (hypertext transfer protocol) pipeline that is configured to process web application requests, and is modified to be capable of instrumenting web applications. FIGS. 7-9 show block diagrams of examples of response pipeline 202 that are configured to generate instrumented web applications in response to web application requests, according to embodiments. FIGS. 7-9 are described as follows.

FIG. 7 shows a block diagram of an HTTP pipeline 702, according to an example embodiment. HTTP pipeline 702 is an example of response pipeline 202, and is configured to insert instrumentation code into client application code as the client application code passes through HTTP pipeline 702. For instance, referring to FIG. 4, application server 104 may function as a web server, and web application request 110 may be a request from browser 106 to the web server for an ASP.NET page. ASP.NET is a web application framework developed by Microsoft Corporation of Redmond, Wash. In such an example, an ASP.NET engine of application server 104 may invoke a plurality of stages of an HTTP pipeline that generate client application code 406 as a markup page, which is returned to browser 106 to be rendered for display. In the embodiment of FIG. 7, HTTP pipeline 702 is configured to generate client application code 406 as a markup page, and to insert instrumentation code into the markup page to generate instrumented client application code 112.

As shown in FIG. 7, HTTP pipeline 702 includes a plurality of stages, including first-nth stages 704a-704n, and a response filter 706. Stages 704a-704n may each be configured to perform a corresponding function directed towards generating client application code 406, such as authentication (e.g., authenticating browser 106 for secure communications), authorization (confirming access for request 110), generating client application code 406 corresponding to the requested web application, etc. For example, in an embodiment, client application code generator 204 may be one of first-nth stages 704a-704n, such as stage 704a. Furthermore, application instrumenting module 206 (e.g., application scanning module 602 and instrumentation insertion module 604 in FIG. 6) may be included in response filter 706, which is an HTTP filter.

Response filter 706 is configured to intercept client application code 406 (e.g., in step 304 of FIG. 3), and to insert instrumentation code into client application code 406 to generate instrumented client application code 112 (e.g., in step 306 of FIG. 3). In an embodiment, application scanning module 602 of response filter 706 may be configured to by a developer. The developer may generate a custom user control that is included in application scanning module 602. The custom user control is configured to detect particular types of client application code pages into which the developer wants to insert instrumentation code. For example, the custom user control may be configured to search for predetermined criteria, such as a particular file type, file extension, and/or other attribute, to detect client application code pages to be instrumented. Each time client application code 406 passes through HTTP pipeline 702, application scanning module 602 scans the client application code 406. If the custom user control determines that received client application code 406 includes one or more of the predetermined criteria, application scanning module 602 indicates the client application code 406 for instrumenting by instrumentation insertion module 604.

An example custom user control that may be used by application scanning module 602 of response filter 706 is shown below:

```
public partial class ScriptWebUserControl1 : System.Web.UI.UserControl
{
    protected void Page_Load(object sender, EventArgs e)
    {
    }
    protected override void OnInit(EventArgs e)
    {
        this.Page.Response.Filter = new PerfFilter(Response.Filter);
        base.OnInit(e);
    }
}
```

As shown above, this custom user control invokes a PerfFilter (Response.Filter) function that is configured to scan client application code 406 for one or more particular attributes that indicate client application code 406 is to be instrumented. This example custom user control is provided for purposes of illustration, and is not intended to be limiting. Custom user controls may be configured in any number of ways, as would be understood by persons skilled in the relevant art(s) from the teachings herein.

Furthermore, an example is shown below of modification code that may be included in instrumentation insertion module 604 of response filter 706 to modify client application code 406 to insert instrumentation code if indicated for instrumentation by the example custom user control shown above:

```
public class PerfFilter : MemoryStream
{
    private Stream originalStream;
    public override void Write(byte[ ]buffer, int offset, int count)
    {
        // inject the response in the stream based on configuration policies
        originalStream.Write(UTF8Encoding.UTF8.GetBytes(contentInBuffer),
        offset, UTF8Encoding.UTF8.GetByteCount(contentInBuffer));
    }
}
```

As shown above, this modification code invokes an originalStream.Write function that may be configured to insert instrumentation code into client application code 406. This modification code may be generated by the developer of the example custom user control to modify client application code 406 as desired. This example modification code is provided for purposes of illustration, and is not intended to be limiting. Modification code may be configured in any number of ways, as would be understood by persons skilled in the relevant art(s) from the teachings herein.

FIG. 8 shows a block diagram of an HTTP pipeline 802, according to another example embodiment. HTTP pipeline 802 is an example of response pipeline 202, and is configured to insert instrumentation code into client application code as the client application code passes through HTTP pipeline 802. In the embodiment of FIG. 8, a HTTP module is used to insert instrumentation code into client application code in a similar approach as FIG. 7, but rather than using a custom user control, instrumented code will be inserted based on a configuration declaration. As such, in the embodiment of FIG. 8, instrumentation code may be inserted into all client application code as the client application code passes through HTTP pipeline 802, rather than inserting instrumentation code into client application code that meets predetermined filter criteria.

As shown in FIG. 8, HTTP pipeline 802 includes first-nth HTTP modules 804a-804n and an HTTP handler 806. HTTP modules and HTTP handlers are included in architectures such as the ASP.NET architecture. Each web application request may be processed by multiple HTTP modules (for example, an authentication module, a session module, etc.) and is subsequently processed by an HTTP handler. After the HTTP handler has processed the web application request, the web application request flows back through the HTTP modules. Thus, HTTP modules may be called before and after the HTTP handler executes. HTTP modules may be configured by developers to enable the developers to intercept, participate in, or modify each individual web application request.

In an embodiment, application instrumenting module 206 (e.g., application scanning module 602 and instrumentation insertion module 604 in FIG. 6) may be included in an HTTP module 804, such as nth HTTP module 804n. For instance, HTTP module 804n may be configured to intercept client application code 406 (e.g., in step 304 of FIG. 3), and to insert instrumentation code into client application code 406 to generate instrumented client application code 112 (e.g., in step 306 of FIG. 3).

For instance, HTTP module 804n may be configured to implement the IHttpModule interface, which is located in the System.Web namespace. The IHttpModule interface of the Microsoft®.NET Framework provides for HTTP module initialization and disposal events to an implementing class. The <httpModules> configuration section handler configures HTTP modules within a web application, and can be declared at the computer, site, or application level. To inject the instrumentation code, HTTP module 804n may be generated using the IHttpModule interface. The IHttpModule interface has two methods with the following signatures:

void Init(HttpApplication);
void Dispose( );

In such an embodiment, application scanning module 602 may be configured to intercept all instances of client application code 112, and instrumentation insertion module 604 may be configured to insert corresponding instrumentation code. For example, upon the initialization of HTTP module 804a for all web application requests 110, client application code 406 may be modified in a similar manner as described above with regard to HTTP pipeline 702 (e.g., modified by response filter 706) of FIG. 7. On the Init implementation, the events BeforeProcessRequest and AfterProcessRequest can be subscribed to, and client application code 406 may be modified to generate instrumented client application code 112 to be transmitted to client 102.

FIG. 9 shows a block diagram of response pipeline 902, according to another example embodiment. Response pipeline 902 is an example of response pipeline 202, and is configured to insert instrumentation code into client application code as the client application code passes through response pipeline 902. As shown in FIG. 9, response pipeline 902 includes a profiler 904. In the embodiment of FIG. 9, profiler 904 is used to scan client application code, and to insert instrumentation code into client application code meeting the scanning policy. As such, in an embodiment, profiler 904 may include application instrumenting module 206 (e.g., application scanning module 602 and instrumentation insertion module 604 in FIG. 6). Profiler 904 may be configured to intercept client application code 406 (e.g., in step 304 of FIG. 3), and to insert instrumentation code into client application code 406 to generate instrumented client application code 112 (e.g., in step 306 of FIG. 3).

For example, profiler 904 may implement a CLR (Common Language Runtime) profiler technology, such as Microsoft® Visual Studio® Intellitrace technology, to modify a response handle (e.g., using the ProcessRequest framework implementation). This technique can be applied at a web application level or a page level, and does not use a custom user control. Instead, a scanning policy regarding the instrumentation code to be inserted into client application code may be described using one or more configuration files.

As such, in embodiments, web applications can be instrumented by response pipeline 202 in various ways, including scanning for particular web application pages to instrument, instrumenting all web application pages, or instrumenting web applications pages that meet a particular profile. For instance, as described above, response pipeline 202 may use an HTTP filter (response filter 706) that instruments specific web application pages (e.g., pages that include a custom user control), an HTTP module (e.g., HTTP module 804*n*) that instruments all requested web applications, or a profiler technology such as Microsoft® Visual Studio® Intellitrace. In further embodiments, response pipeline 202 may be configured in further ways to instrument requested web applications, such as being configured as a WCF pipeline that inserts instrumentation code into requested web applications, or being configured for other types of response pipelines and/or in other ways.

Figure 10:
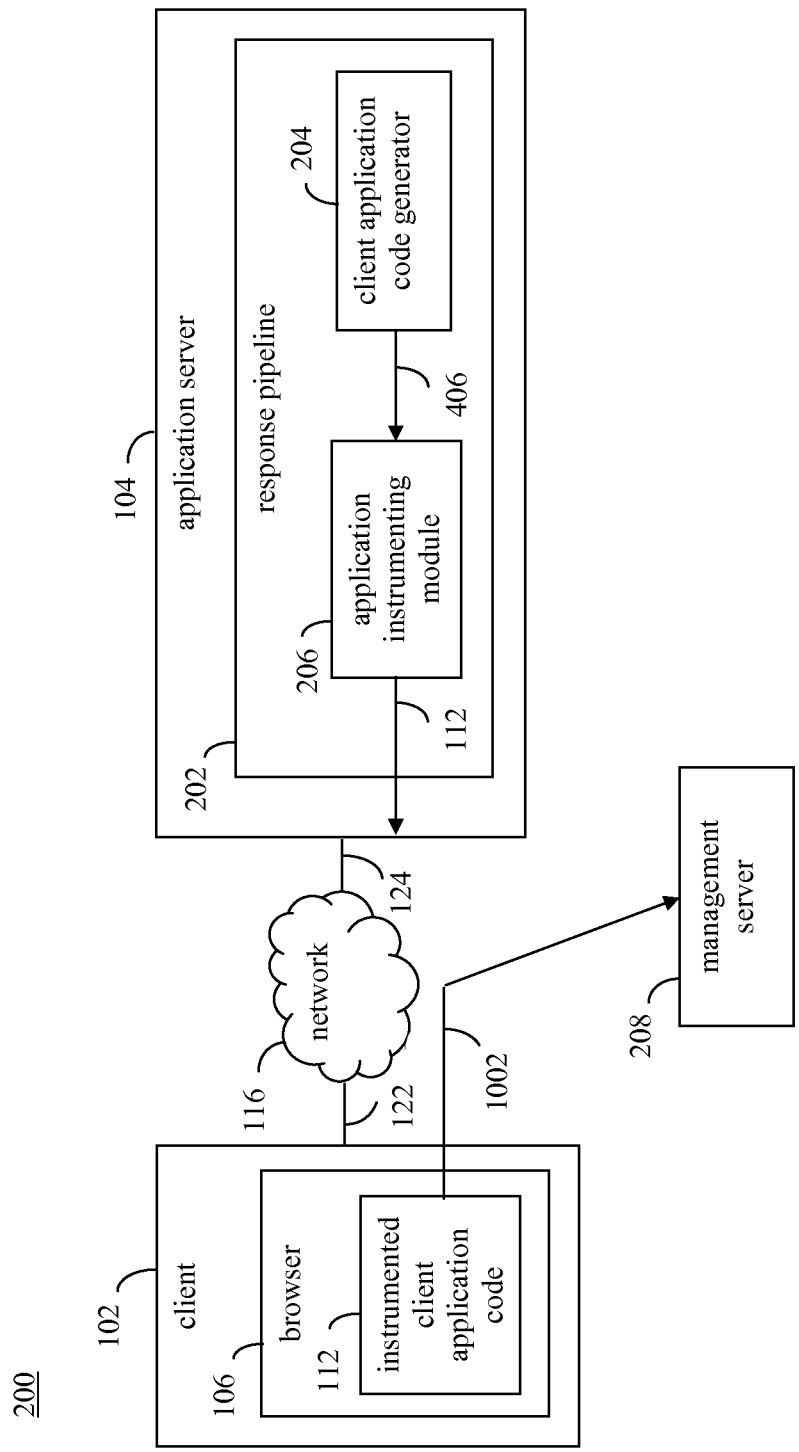
FIG. 10 shows the data communication system of FIG. 2, where instrumented client application code corresponding to a requested web application is received at a client, according to an example embodiment.
Figure 11:
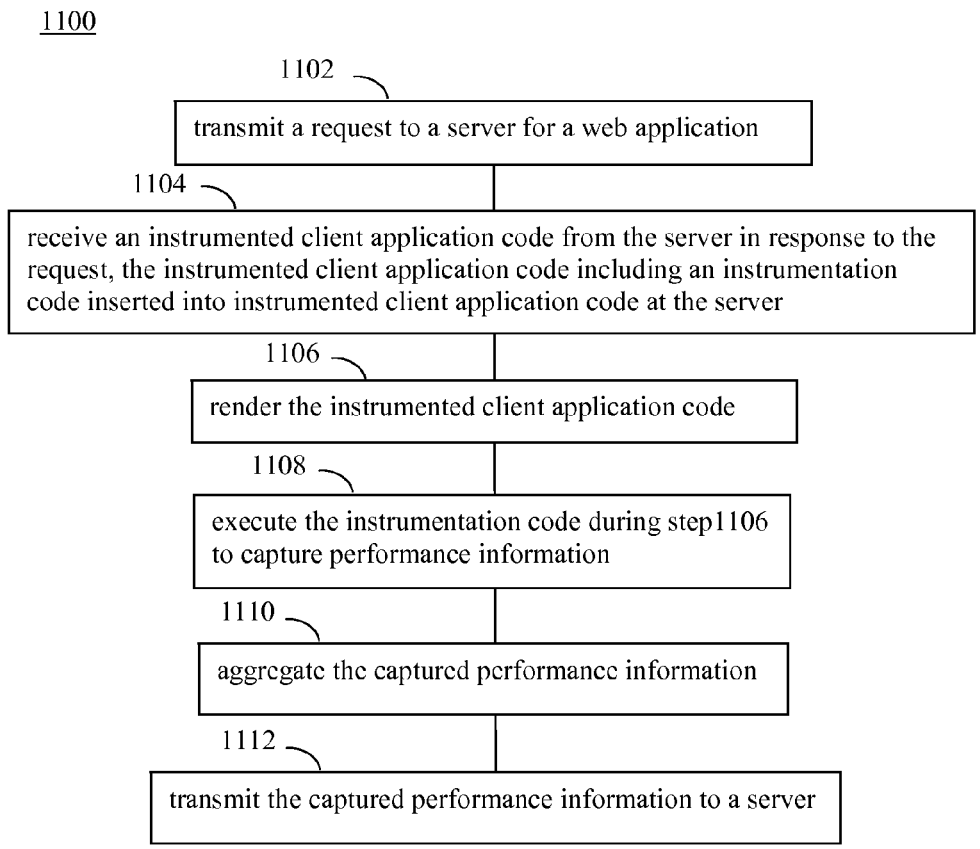
FIG. 11 shows a flowchart for handling an instrumented web application at a client, according to an example embodiment.

C. Example Client Side Rendering of Instrumented Web Applications and Interactions with Management Servers In embodiments, a web application may be requested and received by a client that includes instrumentation code. The instrumentation code may be executed to monitor performance aspects of the web application at the client. FIG. 10 shows system 200 of FIG. 2, and illustrates client 102 having received instrumented client application code 112 corresponding to the web application requested in request 110, according to an example embodiment. System 200 of FIG. 10 is further described as follows with respect to FIG. 11, which shows a flowchart 1100 for displaying an instrumented web application at a client, according to an example embodiment. In an embodiment, system 200 may operate according to flowchart 1100. Further structural and operational embodiments will be apparent to persons skilled in the relevant art(s) based on the discussion regarding flowchart 1100. Flowchart 1100 and system 200 are described as follows.

Flowchart 1100 begins with step 1102. In step 1102, a request is transmitted to a server for a web application. For example, as described above with respect to FIG. 4, browser 106 may generate a web application request 110 that is transmitted to application server 104.

In step 1104, an instrumented client application code is received from the server in response to the request, the instrumented client application code including an instrumentation code inserted into instrumented client application code at the server. For example, as described above with respect to FIG. 4, instrumented client application code 112 is received from application server 104 in response to web application request 110. Instrumented client application code 112 includes instrumentation code that was inserted at application server 104.

In step 1106, the instrumented client application code is rendered. For example, as shown in FIG. 10, browser 106 at client 102 may load instrumented client application code 112 for rendering. Browser 106 may render instrumented client application code 112 in a manner as would be known to persons skilled in the relevant art(s). By rendering instrumented client application code 112, the requested web application is executed in browser 106. For example, depending on the particular configuration of instrumented client application code 112, a media player, a webmail tool, an online retail sales site, an online auction, a wiki, and/or other type of web application may be rendered in browser 106.

In step 1108, the instrumentation code is executed during step 1106 to capture performance information. For example, in addition to the web application of instrumented client application code 112 being rendered, the instrumentation code inserted into instrumented client application code 112 at application server 104 is executed. As such, the performance information configured to be captured by the instrumentation code may be captured.

Figure 12:
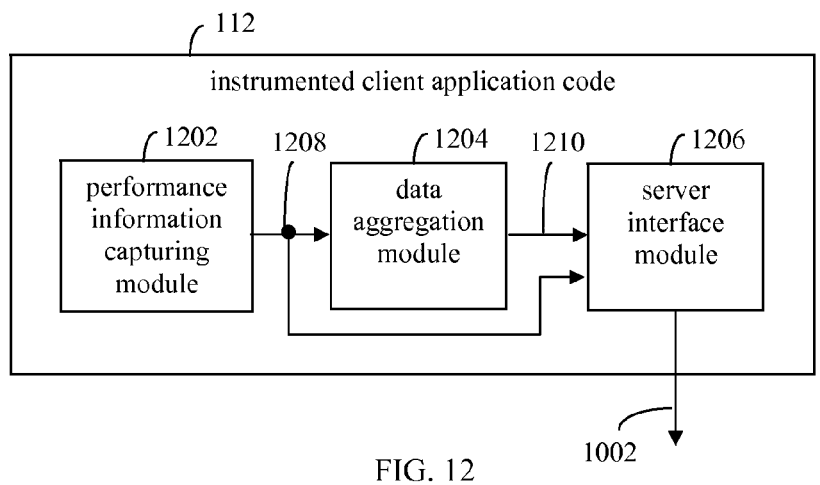
FIG. 12 shows a block diagram of instrumented client application code, according to an example embodiment.

For instance, FIG. 12 shows a block diagram of instrumented client application code 112, according to an example embodiment. In addition to including web application functionality, instrumented client application code 112 may include a performance information capturing module 1202, a data aggregation module 1204, and a server interface module 1206. These elements of instrumented client application code 112 are described as follows.

Performance information capturing module 1202 is configured to capture performance information according to step 1108. Any type of performance information associated with the web application and client 102 may be captured by performance information capturing module 1202. Examples of performance information that may be captured with regard to the web application include web application render time and/or duration, web application loading time, web application errors, and/or any other metrics. Performance information associated with the health of the application may be captured, including capturing data indicating whether one or more actions of the web application is/are responsive, and/or capturing error information indicating one or more errors and/or failures during the execution of the application. Examples of performance information associated with client 102 that may be captured include capturing data indicating a type and/or version of browser 106, capturing data indicating a locale of the client, capturing data indicating a language at the client, capturing data indicating a type of operating system implemented at client 102, etc.

For instance, some examples of metrics that may be calculated by performance information capturing module 1202 as captured performance information include: In a Microsoft® Silverlight™ web application example, calculating metrics for the Microsoft® Silverlight™ framework initialized using Sys.Application.init( ); in AJAX-based web application examples, calculating metrics for AJAX scripts queued loading time, and/or calculating metrics for AJAX scripts load time using Sys.Application.notifyScriptLoaded( ); calculating metrics for Sys.Application load/unload using its events; calculating metrics for Sys.Component initialize; and calculating metrics for Sys.Component.$create. In another example, performance information capturing module 1202 may capture Sys.Exception exceptions created by Error.create for scripts such as Sys.SCriptLoadFailedException. These examples of performance information are provided for purposes of illustration, and are not intended to be limiting. In embodiments, performance information capturing module 1202 may be configured to capture any type of performance information associated with a web application, browser 106, and/or client 102. As shown in FIG. 12, performance information capturing module 1202 generates captured performance information 1208.

In step 1110, the captured performance information is aggregated. Step 1110 is optional. When present, data aggregation module 1204 of FIG. 12 may be configured to aggregate captured performance information. For example, browser 106 may load and render instrumented client application code 112 multiple times (e.g., perform step 1106 multiple times) according to user demand, and each time instrumented client application code 112 is loaded and rendered, corresponding performance information may be captured by performance information capturing module 1202. In an embodiment, data aggregation module 1204 may be present to collect and aggregate the performance information captured during each rendering of instrumented client application code 112.

Aggregation of the captured performance information by data aggregation module 1204 may be performed in various ways. For example, in one embodiment, data aggregation module 1204 may aggregate captured performance information by storing each instance of captured performance information in a table, array, or other data structure. In another embodiment, data aggregation module 1204 may aggregate captured performance information by performing operations on the captured performance information, such as summing the captured performance information and/or performing other arithmetical operations on the captured performance information. In still another embodiment, data aggregation module 1204 may aggregate captured performance information by performing comparisons on captured performance information, categorizing captured performance information, and/or performing further techniques for organizing captured performance information. As shown in FIG. 12, data aggregation module 1204 generates aggregated performance information 1210.

In step 1112, the captured performance information is transmitted to a server. For example, in an embodiment, server interface module 1206 of instrumented client application code 112 is configured to transmit captured performance information to a server. For instance, as shown in FIG. 10, server interface module 1206 may be configured to transmit captured performance information 1002 to management server 208. Management server 208 may be a separate server from application server 104 or may be the same server. Management server 208 may be a server local to client 102 (e.g., an "enterprise" server), or may be a server accessed by client 102 over network 116 (e.g., a "cloud-based" server). Client 102 may include a network interface, such as described elsewhere herein, for transmitting information over communication links, including captured performance information 1002.

As shown in FIG. 12, server interface module 1206 may receive captured performance information 1208 and/or aggregated performance information 1210 (when present). During each rendering of instrumented client application code 112, server interface module 1206 may be configured to transmit captured performance information 1208 to management server 208 as captured performance information 1002. In another embodiment, server interface module 1206 may be configured to transmit aggregated performance information 1210 to management server 208 as captured performance information 1002 on a periodic or non-periodic basis. For instance, server interface module 1206 may be configured to transmit aggregated performance information 1210 to management server 208 after a predetermined number of renderings of instrumented client application code 112 by browser 106, at predetermined time intervals (e.g., a predetermined number of times each day, at particular times each day, once every day at a particular time, once every five days, once every month, etc.), or on other basis.

D. Example Management Server Embodiments

Figure 13:
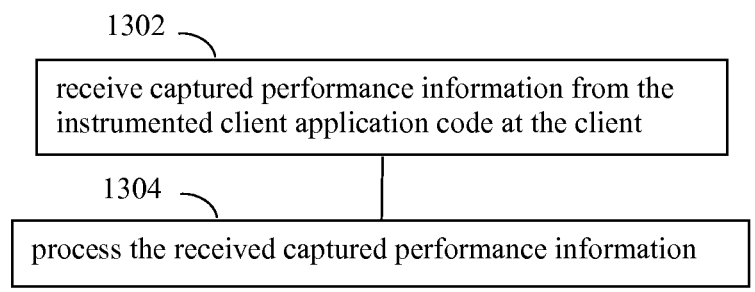
FIG. 13 shows a flowchart for handling captured performance information at a management server, according to an example embodiment.

In embodiments, management server 208 may be configured to process captured performance information 1002 received from instrumented client application code 112 in any manner, as desired for a particular implementation. FIG. 13 shows a flowchart 1300 for handling captured performance information at a management server, according to an example embodiment. In an embodiment, management server 208 may operate according to flowchart 1300. Further structural and operational embodiments will be apparent to persons skilled in the relevant art(s) based on the discussion regarding flowchart 1300. Flowchart 1300 is described as follows.

Flowchart 1300 begins with step 1302. In step 1302, captured performance information is received from the instrumented client application code at the client. For example, as shown in FIG. 10, captured performance information 1002 generated by instrumented client application code 112 running in browser 106 may be received by management server 208 from client 102. For example, as shown in FIG. 5, management server 208 may include a performance data receiving module 506 that is configured to receive captured performance information 1002. As further described below, performance data receiving module 506 may include one or more interfaces for receiving captured performance information 1002. As described above, captured performance information 1002 may or may not include aggregated performance information.

In step 1304, the received captured performance information is processed. In embodiments, management server 208 may process captured performance information 1002 in any manner, as desired for the particular implementation. If captured performance information 1002 is not aggregated, management server 208 may aggregate captured performance information 1002 in a similar manner as described above for data aggregation module 1204, and/or in any other manner. For instance, management server 208 may generate reports of running counters, such as average response time, for a web application request, over a period of time before the aggregated data is presented to one or more users, such as a System Center Operations Manager (SCOM) management group. By providing captured performance information 1002, users are enabled to determine whether a web application was available to client computers, a response time for providing the web application, and how well the web application performed from the standpoint of the end users at client computers.

Performance data receiving module 506 of management server 208 may include one or more interfaces for receiving captured performance information 1002 from clients. For instance, in some of the examples described above, a "makeCall (operationName,counterName)" function may be invoked from client application code to provide time or performance counter values to management server 208. The makeCall function may be called in different ways, using different operationName and counterName parameters, which may be handled by corresponding interfaces of performance data receiving module 506.

For instance, example interface code that may be implemented by performance data receiving module 506 to receive captured performance information is shown below:

```
public interface ITxAxctualMonitoring
{
  [OperationContract]
    [WebInvoke(ResponseFormat = WebMessageFormat.Json,
BodyStyle = WebMessageBodyStyle.Wrapped)]
    public int StartPerfCounter(Guid objectId, Guid instanceId,
  string counterName, int counterValue);
  [OperationContract]
    [WebInvoke(ResponseFormat = WebMessageFormat.Json,
BodyStyle = WebMessageBodyStyle.Wrapped)]
    public int EndPerfCounter(Guid objectId, Guid instanceId,
  string counterName, int counterValue);
  [OperationContract]
```

```
[WebInvoke(ResponseFormat = WebMessageFormat.Json,
BodyStyle = WebMessageBodyStyle.Wrapped)]
    public int mediaOpened (Guid objectId, Guid instanceId,
    string counterName, int counterValue);
    [OperationContract]
    [WebInvoke(ResponseFormat = WebMessageFormat.Json,
BodyStyle = WebMessageBodyStyle.Wrapped)]
    public int mediaEnded (Guid objectId, Guid instanceId,
string counterName, int counterValue);
    [OperationContract]
    [WebInvoke(ResponseFormat = WebMessageFormat.Json,
BodyStyle = WebMessageBodyStyle.Wrapped)]
    public int ReportException(Guid objectId, ExceptionData exception);
}
```

The above example interface code provides four interfaces corresponding to four possible invocations of the makeCall function using different operationName and counterName parameters, and includes an additional interface corresponding to an exception function. Instrumented client application code 112 at client 102 may invoke the makeCall function using "StartPerfCounter" and "Page Load" as the operationName and counterName parameters. In such case, a performance counter value may be received from instrumented client application code 112 corresponding to the starting of the web application page load. The "objectId" and "instanceId" parameters may also be received from instrumented client application code 112 to identify client 102 to management server 208.

Similarly, instrumented client application code 112 at client 102 may invoke the makeCall function using "EndPerfCounter" and "Page Load" as the operationName and counterName parameters. In such case, a performance counter value may be received from instrumented client application code 112 corresponding to the ending of the web application page load. Instrumented client application code 112 at client 102 may invoke the makeCall function using "mediaOpened" and "OnClientMediaOpened" as the operationName and counterName parameters. In such case, a performance counter value may be received from instrumented client application code 112 corresponding to the beginning of the .wmv media file load. Instrumented client application code 112 at client 102 may invoke the makeCall function using "mediaEnded" and "OnClientMediaEnded" as the operationName and counterName parameters. In such case, a performance counter value may be received from instrumented client application code 112 corresponding to the ending of the .wmv media file load. The additional example interface code shown above enables instrumented client application code 112 to provide exception information when there is a failure at client 102 to load or render a received web application (e.g., a failure to render the .wmv file, etc.).

This example of interface code is provided for purposes of illustration, and is not intended to be limiting. Interface code of performance data receiving module 506 may be configured in any number of ways, as would be understood by persons skilled in the relevant art(s) from the teachings herein. Such interface code may be configured to receive any type and quantity of captured performance information, having any number of parameters, from instrumented client application code 112.

E. Example Benefits

Embodiments may provide one or more benefits, as described herein. Examples of such benefits are described as follows.

Developer Participation and Coordination: Web 2.0 application by their very nature include dynamic content within the web application itself or from other sources, as the web applications combine data and content from other sources to create complex mash-ups of information. In approaches where the developer has to inject specific instrumentation (because the developer is the one who knows the web application content), the developer may have to change the instrumentation code and/or the management server every time web application content changes, which may not be not feasible. In an embodiment, using heuristics, the appropriate types of instrumentation to be used for web applications can be determined, and the web application can be modified accordingly as it passes through the response pipeline. Such heuristics can determine what type of content and functions need to be measured and inject the corresponding instrumentation code without developer involvement.

Scale: Last mile or end user monitoring is typically a catch all effort in which all users data is collected, which causes handling of the scale of information both difficult from a server load and from an analysis standpoint. Other solutions may also capture data in a raw format that also increases the server load and requires levels of aggregation to become meaningful. In embodiments, because the configuration of what is monitored and when it is monitored can be controlled, smart sampling of information can be used to obtain a wide variety of data for performance and availability monitoring while reducing server load and minimizing the need for complex analysis. For example, captured data associated with a sample representative set of clients from a category of clients (e.g., the Mozilla Firefox® browser of a particular version) may be performed (e.g., so as not to overwhelm the management system). Aggregation may be performed on the client such that performance data transmitted to the management server is already aggregated and ready to be consumed. In an embodiment, a web service can also perform additional aggregation before making it available to a monitoring/reporting system.

Correlation with Client Configuration: It is desired to perform analysis of data from an end-user experience such that the data is clustered by device type, version of client, location, content, etc. This information is available on the application server, but not necessarily at the management server. As such, solutions typically involve combining data from multiple sources to make it meaningful. Monitoring data may provide performance and availability metrics, but may need access to IIS logs to obtain client browser types and client locations. As such, complex correlation is needed to produce actionable data. In embodiments, inserted instrumentation code may include code to capture data about the client browser, the client locale, and/or the client language, which may be posted to the management server along with the captured performance information. As such, it becomes easier to perform cluster data sets. By providing all captured data to a single location, analysis may be performed more rapidly, and problems with performance and availability can be narrowed down.

Dynamic Remediation: Web 2.0 applications allow developers to personalize the content delivered to the client by designing content appropriate to the device or browser used by the client. Developers may also adjust content based on network connectivity to take into account clients accessing the data on slower connections. This is typically implemented with hard-coded rules around how content is displayed and involves the developer adding the appropriate instrumentation to enable this. In embodiments, by adding the appropriate instrumentation code to determine performance information at the time the client actually executes the web application, how the application subsequently performs or requests new content based on these values can be controlled. For instance, instrumentation code may automatically be inserted to stop loading content when the performance of currently executing content is determined to be low. Furthermore, instrumentation code may be inserted to change the content viewed at a browser, such as causing a low fidelity advertisement to be displayed when the performance of viewing a video on a page is deemed to be slow. In this manner, subsequent requests do not continue to degrade performance and availability.

III Example Computing Device Embodiments

Browser 106, response pipeline 108, response pipeline 202, client application code generator 204, application instrumenting module 206, scanning policy configuration module 502, monitoring policy configuration module 504, performance data receiving module 506, application scanning module 602, instrumentation insertion module 604, HTTP pipeline 702, first-nth stages 704a-704n, response filter 706, HTTP pipeline 802, first-nth HTTP modules 804a-804n, HTTP handler 806, response pipeline 902, and profiler 904 may be implemented in hardware, software, firmware, or any combination thereof. For example, browser 106, response pipeline 108, response pipeline 202, client application code generator 204, application instrumenting module 206, scanning policy configuration module 502, monitoring policy configuration module 504, performance data receiving module 506, application scanning module 602, instrumentation insertion module 604, HTTP pipeline 702, first-nth stages 704a-704n, response filter 706, HTTP pipeline 802, first-nth HTTP modules 804a-804n, HTTP handler 806, response pipeline 902, and/or profiler 904 may be implemented as computer program code configured to be executed in one or more processors. Alternatively, browser 106, response pipeline 108, response pipeline 202, client application code generator 204, application instrumenting module 206, scanning policy configuration module 502, monitoring policy configuration module 504, performance data receiving module 506, application scanning module 602, instrumentation insertion module 604, HTTP pipeline 702, first-nth stages 704a-704n, response filter 706, HTTP pipeline 802, first-nth HTTP modules 804a-804n, HTTP handler 806, response pipeline 902, and/or profiler 904 may be implemented as hardware logic/electrical circuitry.

Figure 14:
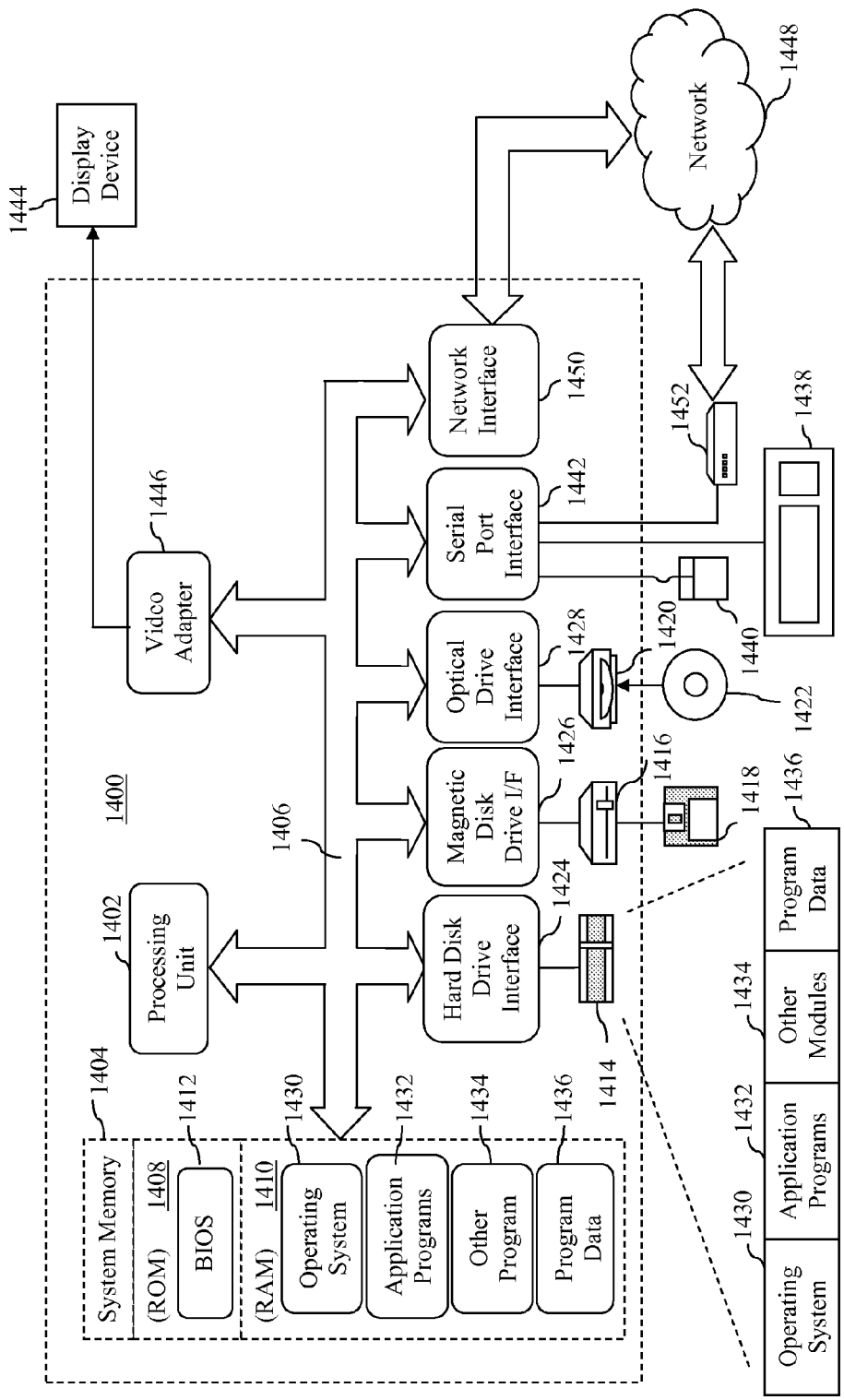
FIG. 14 shows a block diagram of an example computer that may be used to implement embodiments of the present invention.

FIG. 14 depicts an exemplary implementation of a computer 1400 in which embodiments of the present invention may be implemented. For example, client 102, application server 104, and/or management server 208 may each be implemented similarly to computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments of the present invention may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic for implementing browser 106, response pipeline 108, response pipeline 202, client application code generator 204, application instrumenting module 206, scanning policy configuration module 502, monitoring policy configuration module 504, performance data receiving module 506, application scanning module 602, instrumentation insertion module 604, HTTP pipeline 702, first-nth stages 704a-704n, response filter 706, HTTP pipeline 802, first-nth HTTP modules 804a-804n, HTTP handler 806, response pipeline 902, profiler 904, flowchart 300, flowchart 1100, and/or flowchart 1300 (including any step of flowcharts 300, 1100, and 1300).

A user may enter commands and information into the computer 1400 through input devices such as keyboard 1438 and pointing device 1440. Other input devices (not shown) may include a microphone, joystick, game pad, satellite dish, scanner, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 is also connected to bus 1406 via an interface, such as a video adapter 1446. In addition to the monitor, computer 1400 may include other peripheral output devices (not shown) such as speakers and printers.

Computer 1400 is connected to a network 1448 (e.g., the Internet) through an adaptor or network interface 1450, a modem 1452, or other means for establishing communications over the network. Modem 1452, which may be internal or external, is connected to bus 1406 via serial port interface 1442.

As used herein, the terms "computer program medium" and "computer-readable medium" are used to generally refer to media such as the hard disk associated with hard disk drive 1414, removable magnetic disk 1418, removable optical disk 1422, as well as other media such as flash memory cards, digital video disks, random access memories (RAMs), read only memories (ROM), and the like.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments of the present invention discussed herein. Accordingly, such computer programs represent controllers of the computer 1400.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method implemented in one or more servers having one or more processors, the method comprising:
    intercepting a client application code in a response pipeline, the client application code generated in response to a request from a client for a web application, the request for the web application being processed using a plurality of HTTP (hypertext transfer protocol) modules and an HTTP handler in the response pipeline, said intercepting comprising receiving the client application code at an HTTP module of the plurality of HTTP modules;
    inserting the instrumentation code into the intercepted client application code using the HTTP module to generate an instrumented client application code, the instrumentation code being configured to be executed when the instrumented client application code is rendered at the client to capture performance information at the client, and being configured to transmit the captured performance information from the client; and
    providing the instrumented client application code to be transmitted to the client.

2. The method of claim 1, wherein said inserting comprises:
    modifying page code of the client application code.

3. The method of claim 1, further comprising:
    configuring the instrumentation code to capture data regarding at least one of a type of browser at the client, a locale of the client, or a client language.

4. The method of claim 1, further comprising:
    receiving from the client performance information captured by the instrumented client application code.

5. The method of claim 1, further comprising:
    analyzing the client application code to determine one or more attributes of the client application code to monitor; and
    configuring the instrumentation code to monitor the one or more attributes of the client application code.

6. The method of claim 1, further comprising:
    determining that the client application code meets predetermined criteria for receiving the instrumentation code; and
    inserting the instrumentation code into the intercepted client application code using the HTTP module when the client application code meets the predetermined criteria.

7. The method of claim 6, wherein said determining that the client application code meets predetermined criteria for receiving the instrumentation code is performed each time the client application code passes through the response pipeline.

8. A server, having a processor, comprising:
    a response pipeline configured to generate a data stream to provide a client application code to a client in response to a request from the client for a web application, the request for the web application being processed using a plurality of HTTP (hypertext transfer protocol) modules and an HTTP handler in the response pipeline;
    an application scanning module configured to intercept the client application code in the response pipeline, the application scanning module being included in an HTTP module of the plurality of HTTP modules; and
    an instrumentation insertion module configured to insert the instrumentation code into the intercepted client application code to generate an instrumented client application code, the instrumentation code being configured to be executed when the instrumented client application code is rendered at the client to capture performance information at the client, and being configured to transmit the captured performance information from the client, the instrumentation insertion module being included in the HTTP module of the plurality of HTTP modules;
    the response pipeline being configured to provide the instrumented client application code to be transmitted to the client.

9. The server of claim 8, wherein the instrumentation insertion module is configured to modify page code of the client application code.

10. The server of claim 8, wherein the instrumentation insertion module is configured to configure the instrumentation code to capture data regarding at least one of a browser at the client, a locale of the client, or a client language.

11. The server of claim 8, further comprising:
    a performance data receiving module that is configured to receive captured performance information from the instrumented client application code;
    the performance data receiving module being configured to sample captured performance information received from a category of clients to generate a data set associated with a set of clients, and to analyze the data set associated with the set of clients.

12. The server of claim 8, wherein the instrumentation insertion module is configured to analyze the client application code to determine one or more functions of the client application code to monitor; and
    the instrumentation insertion module is configured to configure the instrumentation code to monitor the one or more functions of the client application code.

13. The server of claim 8, wherein the application scanning module is configured to determine whether the client application code meets predetermined criteria for receiving the instrumentation code; and
    wherein the instrumentation insertion module is configured to insert the instrumentation code into the intercepted client application code if the client application code meets the predetermined criteria.

14. The server of claim 13, wherein the application scanning module includes a custom user control configured to search for the predetermined criteria.

15. A device having one or more processors and a memory storing instructions, the one or more processors configured to perform a method in accordance with the instructions stored in the memory, the method comprising:
    intercepting a client application code in a response pipeline, the client application code generated in response to a request from a client for a web application, the request for the web application being processed using a plurality of HTTP (hypertext transfer protocol) modules and an HTTP handler in the response pipeline, said intercepting comprising receiving the client application code at an HTTP module of the plurality of HTTP modules;
    inserting the instrumentation code into the intercepted client application code using the HTTP module-to generate an instrumented client application code, the instrumentation code being configured to be executed when the instrumented client application code is rendered at the client to capture performance information at the client, and being configured to transmit the captured performance information from the client; and
    providing the instrumented client application code to be transmitted to the client.

16. The device of claim 15, wherein said inserting comprises:
    modifying page code of the client application code.

17. The device of claim 15, wherein the method further comprises:
    configuring the instrumentation code to capture data regarding at least one of a type of browser at the client, a locale of the client, or a client language.

18. The device of claim 15, wherein the method further comprises:
    receiving performance information from the client that was captured by the instrumented client application code.

19. The device of claim 15, wherein the method further comprises:
    analyzing the client application code to determine one or more attributes of the client application code to monitor; and
    configuring the instrumentation code to monitor the one or more attributes of the client application code.

20. The device of claim 15, wherein the method further comprises:
    determining that the client application code meets predetermined criteria for receiving the instrumentation code; and
    inserting the instrumentation code into the intercepted client application code using the HTTP module when the client application code meets the predetermined criteria.

* * * * *